UNITED STATES PATENT OFFICE.

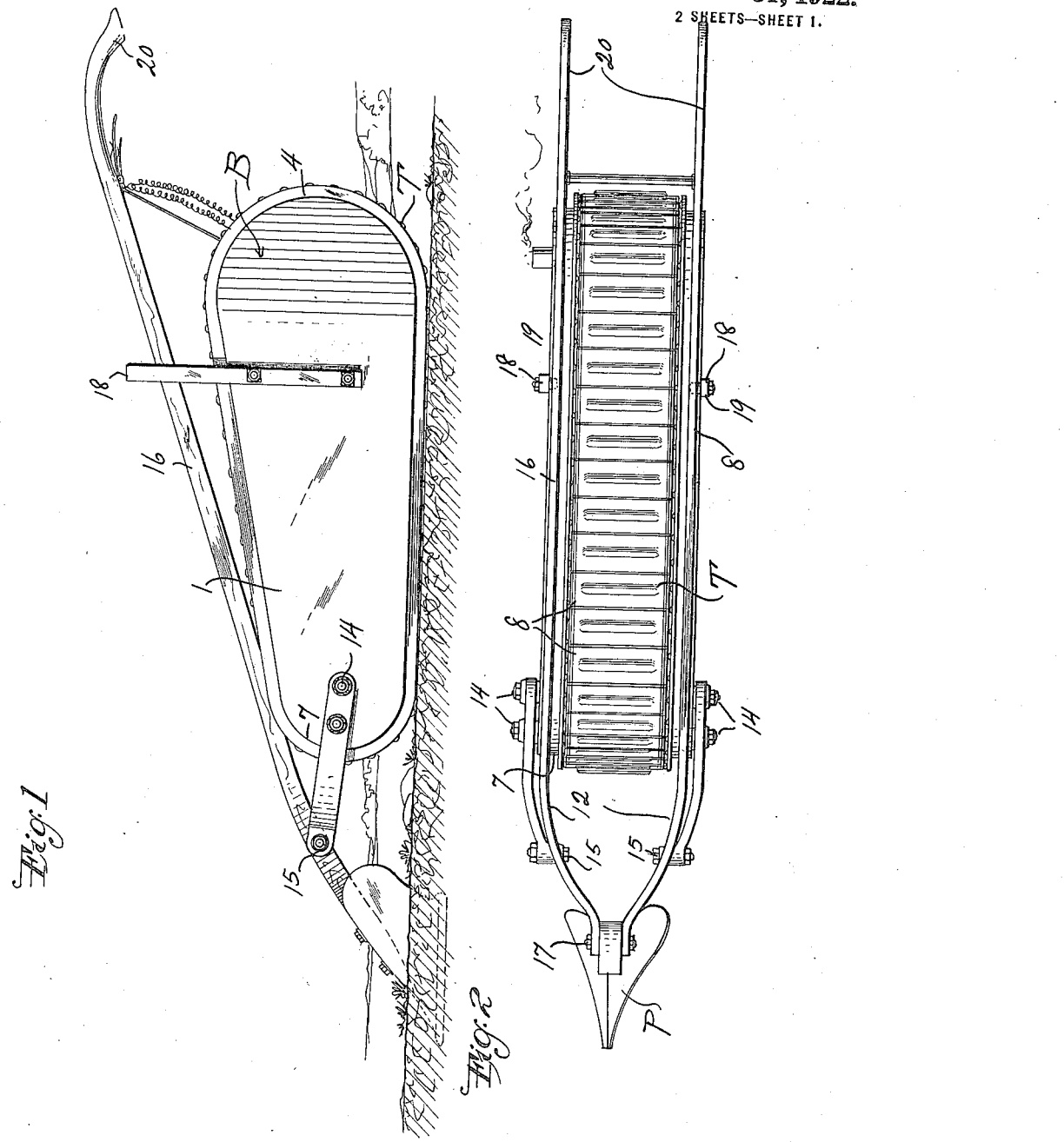

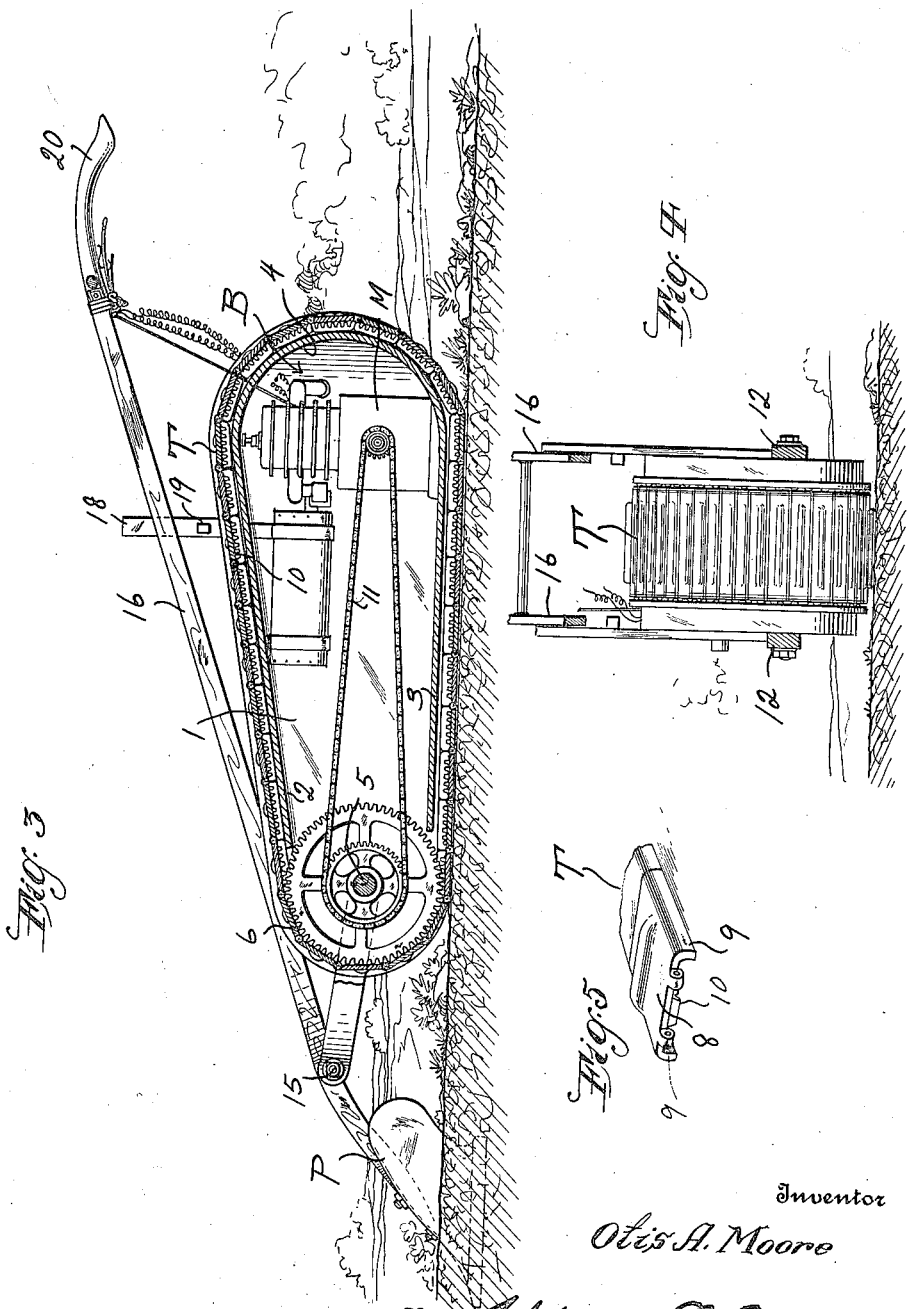

OTIS A. MOORE, OF ALBUQUERQUE, NEW MEXICO.

AGRICULTURAL MACHINE.

1,404,882.  Specification of Letters Patent.  Patented Jan. 31, 1922.

Application filed September 22, 1920. Serial No. 411,965.

*To all whom it may concern:*

Be it known that I, OTIS A. MOORE, a citizen of the United States, residing at Albuquerque, in the county of Bernalillo and State of New Mexico, have invented certain new and useful Improvements in Agricultural Machines, of which the following is a specification, reference being had to the accompanying drawings.

This invention relates to certain improvements in agricultural machines and has relation more particularly to a machine of this general character especially designed and adapted for use for plowing, and it is an object of the invention to provide a novel and improved device of this general character of a tractor type and wherein the tractor is arranged rearwardly of the plow or ground working member.

Another object of the invention is to provide a novel and improved machine of this general character including a tractor embodying a caterpillar tread and wherein a plow or kindred ground working member is operatively supported by said tractor and in a manner whereby said plow or member may be adjusted as required.

The invention consists in the details of construction and in the combination and arrangement of the several parts of my improved agricultural machine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation illustrating an agricultural machine constructed in accordance with an embodiment of my invention.

Figure 2 is a view in top plan of the structure as illustrated in Figure 1.

Figure 3 is a view partly in side elevation and partly in longitudinal vertical section taken through the machine as herein set forth.

Figure 4 is a view partly in rear elevation and partly in section of the machine as illustrated in the preceding figures, and Figure 5 is a fragmentary view in perspective of the caterpillar tread as herein embodied.

As disclosed in the accompanying drawings, B denotes a hollow body comprised in a tractor structure and which includes the side walls 1 and the top and bottom walls 2 and 3; said walls 2 and 3 converging toward the forward end of the body. The rear wall 4 of the body B is arcuate in form and preferably substantially semicircular.

Rotatably supported by the forward end portions of the side walls 1 of the body B is a transversely disposed shaft 5 having fixed thereto at substantially its longitudinal center a gear wheel 6, the forward portion of which wheel extends slightly beyond the front end 7 of the body B. This front end 7 is also arcuate in form and substantially semicircular.

Disposed around the body B in a direction longitudinally thereof is a caterpillar tread T and each section 8 of the tread T has its side marginal portions defined by the outstanding flanges 9 and which flanges facilitate the requisite coaction of the tread T with the surface over which the tractor is traversing and particularly in view of the fact that said flanges operate to prevent the sections 8 of the tread from cutting into the ground. The flanges 9 also contact with the outer faces of the top and bottom walls 2 and 3 and the end walls 4 and 7 whereby the intermediate portion of each of the sections 8 of the tread T is sufficiently spaced therethrough to prevent obstruction or hindrance to the requisite travel of the tread being offered by the racks 10 carried by the under surface of each of the sections 8 and disposed longitudinally thereof. The gear wheel 6 coacts with the racks 10 of the sections 8 whereby the desired propulsion of the tractor T is obtained.

Mounted within the body B at the rear portion thereof is a motor M preferably of an internal combustion type and which motor is operatively engaged with the axle 5 through the medium of the sprocket chain 11 or otherwise as may best meet with the requirements of practice.

Extending forwardly of the body B are the arms 12 having their inner end portions suitably anchored, as at 14, to the side walls 2. The forward or extended end portions of the arms 12 are inwardly curved and have pivotally engaged, as at 15, between their free extremities the forward end portions of the elongated handle members 16. The handle members 16 in advance of their pivotal connections 15 extend inwardly on a predetermined curvature and are operatively engaged, as at 17, with the plow P or kindred ground working member.

The handle members 16 are capable of vertical swinging movement whereby the plow P may be raised and lowered at the convenience of the operator and in order to hold said handle members against undue lateral swinging movement, the same pass between the upstanding posts or columns 18 carried by the side walls 2 adjacent the rear of the body B. Each of the posts or columns 18 at a point above but in close proximity to the tread member T is provided with an inwardly directed lug 19 with which a handle member 16 contacts upon requisite downward movement.

When the handle members 16 are in contact with the lugs 19, continued downward pressure upon the rear or operating end portions 20 of the handle members 16 will result in the forward end portion of the body B being raised and which movement is permitted and facilitated by the semicircular rear wall 4. This tilting of the body B is further facilitated in view of the fact that the weight of the motor M is substantially positioned within said rear end portion so that the resistance which would otherwise be offered by the weight of the motor M to the upper swinging movement of the forward end of the body B is substantially eliminated. This upward swinging movement of the body B is of material advantage when it is desired to change the direction of travel of the machine, such as turning at the end of a furrow.

It will also be understood that by having the handle members 16 passing between the posts or columns 18, with each of said handle members 16 substantially close to one of the posts or columns 18, the body B together with the plow P may be laterally tilted by the operator as the occasions of practice may require.

From the foregoing description it is thought to be obvious that an agricultural machine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A machine of the class described comprising an elongated hollow body having its rear end portion rounded, tractor means disposed along the bottom thereof, a motor within the body and operatively connected with the tread, an elongated guiding handle member pivotally supported by the forward end portion of the body for swinging movement in a vertical direction, said guiding handle extending to the rear of the tractor so that the tractor may be tilted thereby in turning, and a ground working element operatively supported by said handle.

2. A machine of the class described comprising an elongated hollow body having its rear end portion rounded, traction means disposed along the bottom of the body, a motor within the body adjacent the rear wall thereof and operatively connected with the traction means, an elongated guiding handle member carried by the body, said handle member extending forwardly of the body and also rearwardly of the body, and a ground working element operatively supported by the forward end portion of the handle member.

3. A machine of the class described comprising an elongated hollow body having its rear end portion rounded, traction means disposed along the bottom of the body, a motor within the body adjacent the rear wall thereof and operatively connected with the traction means, an elongated guiding handle member carried by the body, said handle member extending forwardly of the body and also rearwardly of the body, and a ground working element operatively supported by the forward end portion of the handle member, said handle member having limited swinging movement toward the body independently of said body.

In testimony whereof I hereunto affix my signature.

OTIS A. MOORE.